(12) United States Patent
Lorenz

(10) Patent No.: US 11,305,864 B2
(45) Date of Patent: Apr. 19, 2022

(54) WING FOR AN AIRCRAFT

(71) Applicant: Airbus Operations GmbH, Hamburg (DE)

(72) Inventor: Christian Lorenz, Weyhe (DE)

(73) Assignee: AIRBUS OPERATIONS GmbH, Hamburg (DE)

(*) Notice: Subject to any disclaimer, the term of this patent is extended or adjusted under 35 U.S.C. 154(b) by 404 days.

(21) Appl. No.: 16/421,700

(22) Filed: May 24, 2019

(65) Prior Publication Data

US 2019/0359312 A1 Nov. 28, 2019

(30) Foreign Application Priority Data

May 25, 2018 (DE) .......................... 102018112636.0

(51) Int. Cl.
*B64C 3/56* (2006.01)

(52) U.S. Cl.
CPC ..................................... *B64C 3/56* (2013.01)

(58) Field of Classification Search
CPC .... B64C 3/56; B64C 3/54; B64C 1/30; B64C 3/00; B64C 3/42; B64C 5/08; B64C 5/10; B64C 23/65; B64C 23/72; Y02T 50/30; Y02T 50/10
See application file for complete search history.

(56) References Cited

U.S. PATENT DOCUMENTS

| | | | | |
|---|---|---|---|---|
| 262,451 A | * | 8/1882 | McFarlane | B62D 7/023 280/137.504 |
| 1,819,794 A | * | 8/1931 | Maxf | B64C 3/56 244/49 |
| 2,289,224 A | * | 7/1942 | Anderson | B64C 3/56 244/49 |
| 2,468,425 A | * | 4/1949 | Carpenter | B64C 3/56 74/520 |
| 2,712,421 A | * | 7/1955 | Naumann | B64C 3/56 244/49 |
| 2,719,682 A | * | 10/1955 | Handel | B64C 3/56 244/49 |
| 2,881,989 A | * | 4/1959 | Flettner | B64C 27/26 244/6 |

(Continued)

OTHER PUBLICATIONS

German Search Report for DE 10 2018 112 636.0 dated Jan. 25, 2019, 9 pages.

*Primary Examiner* — Medhat Badawi
(74) *Attorney, Agent, or Firm* — Nixon & Vanderhye P.C.

(57) ABSTRACT

A wing for an aircraft is disclosed having a fixed wing, a foldable wing tip portion mounted to the fixed wing via a first hinge rotatable about a first hinge axis between an extended position and a folded position, and an actuation unit for actuating the foldable wing tip portion for movement about the first hinge axis. A wing having an actuation unit with reduced complexity and weight and that is arranged entirely inside the outer contour of the wing is disclosed in which the actuation unit is arranged at one of the fixed wing and the foldable wing tip portion and is coupled to the other of the fixed wing and the foldable wing tip portion via a linkage. The linkage includes a first link element and a second link element, wherein the first link element is rotatably mounted to the one of the fixed wing and the foldable wing tip portion via a second hinge and is rotatably coupled to the second link element via a third hinge.

18 Claims, 4 Drawing Sheets

(56) References Cited

U.S. PATENT DOCUMENTS

| | | | | |
|---|---|---|---|---|
| 2,881,994 A * | 4/1959 | Michael | | B64C 3/26 244/124 |
| 3,039,721 A * | 6/1962 | Rogers, Jr. | | B64D 37/04 244/135 R |
| 3,139,248 A * | 6/1964 | Alvarez-Calderon | | B64C 3/42 244/207 |
| 3,333,792 A * | 8/1967 | Alvarez-Calderon | | B64C 3/54 244/218 |
| 4,061,195 A * | 12/1977 | Pryor | | A01B 73/044 172/456 |
| 4,247,063 A * | 1/1981 | Jenkins | | B64C 5/08 244/91 |
| 4,497,461 A * | 2/1985 | Campbell | | B64C 9/00 244/99.3 |
| 4,717,093 A * | 1/1988 | Rosenberger | | F42B 10/16 244/49 |
| 5,040,747 A * | 8/1991 | Kane | | B64C 25/26 244/102 R |
| 5,201,479 A * | 4/1993 | Renzelmann | | B64C 3/56 244/49 |
| 5,229,921 A * | 7/1993 | Bohmer | | G06F 1/1679 16/324 |
| 5,288,037 A * | 2/1994 | Derrien | | B64C 25/26 244/102 SL |
| 5,310,138 A * | 5/1994 | Fitzgibbon | | B64C 3/56 244/49 |
| 8,276,842 B2 * | 10/2012 | Kracke | | B64C 13/28 244/99.4 |
| 8,733,692 B2 * | 5/2014 | Kordel | | B64C 23/072 244/49 |
| 8,777,153 B2 * | 7/2014 | Parker | | B64C 3/56 244/49 |
| 8,919,703 B2 * | 12/2014 | Parker | | B64C 7/00 244/215 |
| 9,162,755 B2 * | 10/2015 | Guida | | B64C 23/069 |
| 9,211,946 B2 * | 12/2015 | Good | | B64C 3/56 |
| 9,296,469 B2 * | 3/2016 | Santini | | B64C 3/56 |
| 9,415,857 B2 * | 8/2016 | Fox | | B64C 3/56 |
| 9,469,392 B2 * | 10/2016 | Fox | | B64C 23/072 |
| 9,908,612 B2 * | 3/2018 | Fox | | B64C 3/56 |
| 9,914,523 B2 * | 3/2018 | Good | | B64C 3/56 |
| 10,189,557 B2 * | 1/2019 | Boye | | B64C 3/56 |
| 10,501,167 B2 * | 12/2019 | Kracke | | B64C 3/56 |
| 11,066,148 B2 * | 7/2021 | Elenbaas | | B64C 3/42 |
| 2003/0155839 A1 * | 8/2003 | Krimmer | | H01F 7/1607 310/264 |
| 2009/0302151 A1 * | 12/2009 | Holmes | | B64C 3/56 244/49 |
| 2010/0019080 A1 * | 1/2010 | Schweighart | | B64C 3/56 244/49 |
| 2011/0180657 A1 * | 7/2011 | Gionta | | B64C 3/56 244/49 |
| 2012/0292436 A1 * | 11/2012 | Karem | | B64C 3/56 244/49 |
| 2013/0001367 A1 * | 1/2013 | Boer | | B64C 23/072 244/199.3 |
| 2013/0056579 A1 * | 3/2013 | Schlipf | | B64C 3/56 244/49 |
| 2015/0191243 A1 * | 7/2015 | Fujimoto | | B64C 17/00 244/7 R |
| 2016/0090170 A1 * | 3/2016 | Thompson | | B64C 3/56 701/3 |
| 2016/0244145 A1 * | 8/2016 | Thompson | | B64C 23/072 |
| 2016/0251075 A1 * | 9/2016 | Thompson | | B64C 23/072 244/198 |
| 2017/0355438 A1 * | 12/2017 | Bishop | | B64C 3/56 |
| 2017/0355444 A1 * | 12/2017 | Lorenz | | B64C 3/56 |
| 2018/0057144 A1 * | 3/2018 | Lorenz | | B64C 3/56 |
| 2018/0237127 A1 * | 8/2018 | Hewson | | B64C 3/187 |
| 2019/0248468 A1 * | 8/2019 | Lorenz | | B64C 3/56 |
| 2019/0322351 A1 * | 10/2019 | Lorenz | | F16D 55/38 |
| 2019/0337605 A1 * | 11/2019 | Lorenz | | B64C 3/56 |
| 2019/0359311 A1 * | 11/2019 | Lorenz | | B64C 3/56 |
| 2019/0359312 A1 * | 11/2019 | Lorenz | | B64C 3/56 |
| 2019/0389559 A1 * | 12/2019 | Lorenz | | B64C 3/56 |
| 2020/0398969 A1 * | 12/2020 | Lorenz | | B64C 3/56 |

* cited by examiner

WING FOR AN AIRCRAFT

CROSS REFERENCE TO RELATED APPLICATION

This application claims priority to and incorporates by reference German Application Number DE 10 2018 112636.0, filed May 25, 2018.

BACKGROUND

1. Field of the Invention

The disclosure relates to a wing for an aircraft, in particular to a foldable wing including a fixed wing and a foldable wing tip portion. A further aspect of the disclosure relates to an aircraft comprising such a wing.

2. Description of Related Art

Such a wing comprises a fixed wing for being mounted to a fuselage, and a foldable wing tip portion mounted to the fixed wing via a first hinge or hinges rotatable about a first hinge axis between an extended position, where the foldable wing tip portion extends as a continuous extension of the fixed wing preferably in a common plane with the fixed wing, and a folded position, where the foldable wing tip portion extends upwards or rearwards in order to reduce the overall span of the aircraft compared to the extended position. Specifically, when the foldable wing tip portion is foldable upwards, the first hinge axis extends in a horizontal plane and/or in parallel to a chord line and/or in parallel to the wing surface and/or in a flight direction of the aircraft. Alternatively, when the foldable wing tip portion is foldable rearwards, the first hinge axis extends in a vertical direction and/or in a wing thickness direction and/or in a direction transverse or perpendicular to the wing surface.

Further, the wing comprises an actuation unit for actuating the foldable wing tip portion for movement about the first hinge axis relative to the fixed wing, i.e. for movement between the extended and the folded positions. The actuation unit might be powered electrically and/or hydraulically and/or pneumatically.

Foldable wings are developed in order to reduce the space requirements of an aircraft during maneuver and parking on ground. As soon as the aircraft has landed the foldable wing tip portions of the wings are folded upwards or rearwards, thereby reducing the overall span of the aircraft.

Different designs of the actuation unit have been proposed in the art. Generally, the actuation unit should be designed strong enough to reliably move the foldable wing tip portion between the extended and folded positions, but at the same time to have minimum weight and complexity in order to reduce costs of the related aircraft. Additionally, it would be advantageous from both the aerodynamic and the structural point of view if the outer contour or outer skin of the wing would not be penetrated.

SUMMARY

A wing having an actuation unit with reduced complexity and weight and that is arranged entirely inside the outer contour of the wing is disclosed herein.

The actuation unit is arranged at or mounted to the fixed wing and coupled to the foldable wing tip portion via a linkage including at least a first link element and a second link element. The first link element is rotatably mounted with its first end to the fixed wing via a second hinge, and is rotatably coupled with its opposite second end to a first end of the second link element via a third hinge spaced from the second hinge.

Further, the second link element is rotatably coupled with its opposite second end to the foldable wing tip portion via a fourth hinge spaced from the third hinge. Further, the actuation unit is formed as linear actuator configured to adjust or control a distance between a first mount at its first end and a second mount at its second end. The linear actuator might be a length adjustable link or rod, such as a hydraulic or pneumatic cylinder or an electromagnetic linear motor. The first mount is rotatably mounted to the fixed wing via a fifth hinge, and the second mount is rotatably mounted to the first link element via a sixth hinge spaced apart from the second hinge.

Such a linkage together with the first hinge forms a five-bar-linkage, which relates to a particularly advantageous kinematics for transferring actuation loads to the foldable wing tip portion and, therefore, allows to downsize the actuation unit, i.e. to reduce its complexity and weight. At the same time, it is possible that the entire linkage and actuation unit remains inside the outer contour or skin of the wing when the foldable wing tip portion is moved between the extended and the folded positions, so that the outer skin does not need to be penetrated by the linkage or actuation unit.

Alternatively, the arrangement of the actuation unit and the linkage might also be reversed, so that the actuation unit is arranged at the foldable wing tip portion and is coupled to the fixed wing via the linkage, wherein the first link element is rotatably mounted to the foldable wing tip portion via the second hinge, wherein the second link element is rotatably coupled to the fixed wing via the fourth hinge, and wherein the first mount is rotatably mounted to the foldable wing tip portion via the fifth hinge. This alternative arrangement also solves the above mentioned problem of the invention.

According to an embodiment, the second hinge defines a second hinge axis, the third hinge defines a third hinge axis, the fourth hinge defines a fourth hinge axis, the fifth hinge defines a fifth hinge axis, and the sixth hinge defines a sixth hinge axis. The second hinge axis and/or the third hinge axis and/or the fourth hinge axis and/or the fifth hinge axis and/or the sixth hinge axis extend in parallel to the first hinge axis. This relates to a particularly simple and effective design of the linkage.

According to an exemplary embodiment, the fourth hinge is spaced apart from the first hinge in a tip thickness direction of the foldable wing tip portion. In such a way, a particularly efficient five-bar-linkage is formed.

In particular, at least in the extended position of the foldable wing tip portion the fourth hinge may be positioned lower than the first hinge with respect to the tip thickness direction of the foldable wing tip portion in the extended position with respect to an aircraft in normal position on the ground, wherein the first hinge axis may extend in a flight direction or chord direction. In such a way, the linkage pushes the foldable wing tip portion when it is moved upwards to the folded position, which is advantageous as it requires particularly low and homogenous actuation loads from the actuation unit.

According to yet another exemplary embodiment, the second hinge is spaced apart from the first hinge in a wing thickness direction of the fixed wing. In such a way, a particularly efficient five-bar-linkage is formed.

In particular, the second hinge may be positioned lower than the first hinge with respect to the wing thickness direction of the fixed wing of an aircraft in a normal position on the ground, wherein the first hinge axis may extend in a flight direction or chord direction. In such a way, the linkage pushes the foldable wing tip portion when it is moved upwards to the folded position, which is advantageous as it requires particularly low and homogenous actuation loads from the actuation unit.

According to another embodiment, the second hinge is positioned lower than the third hinge with respect to the wing thickness direction of the fixed wing of an aircraft in a normal position on the ground. This applies at least in the extended position of the foldable wing tip portion, and for example, during entire movement of the foldable wing tip portion between the extended and folded positions. This means, the first link element pivots within a range above the second hinge when the foldable wing tip portion is moved between the extended and folded positions. However, in other embodiments the third hinge might also be positioned lower than the second hinge.

According to yet another embodiment, the linkage and the actuation unit are formed and arranged such that they remain entirely inside an outer contour of the wing, and for example formed by an outer skin, when the foldable wing tip portion is moved between the extended and folded positions. This means the contour or skin does not need to be broken cut out for the moving linkage or actuation unit.

According to yet another embodiment, the sixth hinge is arranged at the first link element spaced apart from the second hinge by between 10% to 100%, for example between 30% to 90%, or for example between 50% and 80%, of the distance between the second hinge and the third hinge. In such a way, a particularly advantageous course of actuation loads is required while the linkage and actuation unit can remain inside the outer contour of the wing.

According to yet another exemplary embodiment, the actuation unit is arranged such that the distance between the first mount and the second mount is increased when the foldable wing tip portion is moved to the folded position. This means, the actuation unit pushes the first link element. Such an arrangement allows that the linkage and actuation unit remains inside the outer contour of the wing. However, the actuation unit might also be arranged vice versa, such that the distance between the first mount and the second mount is increased when the foldable wing tip portion is moved to the folded position.

A further aspect of the present invention relates to an aircraft comprising the wing according to any of the embodiments described above. The features and effects described above in connection with the wing apply vis-à-vis to the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
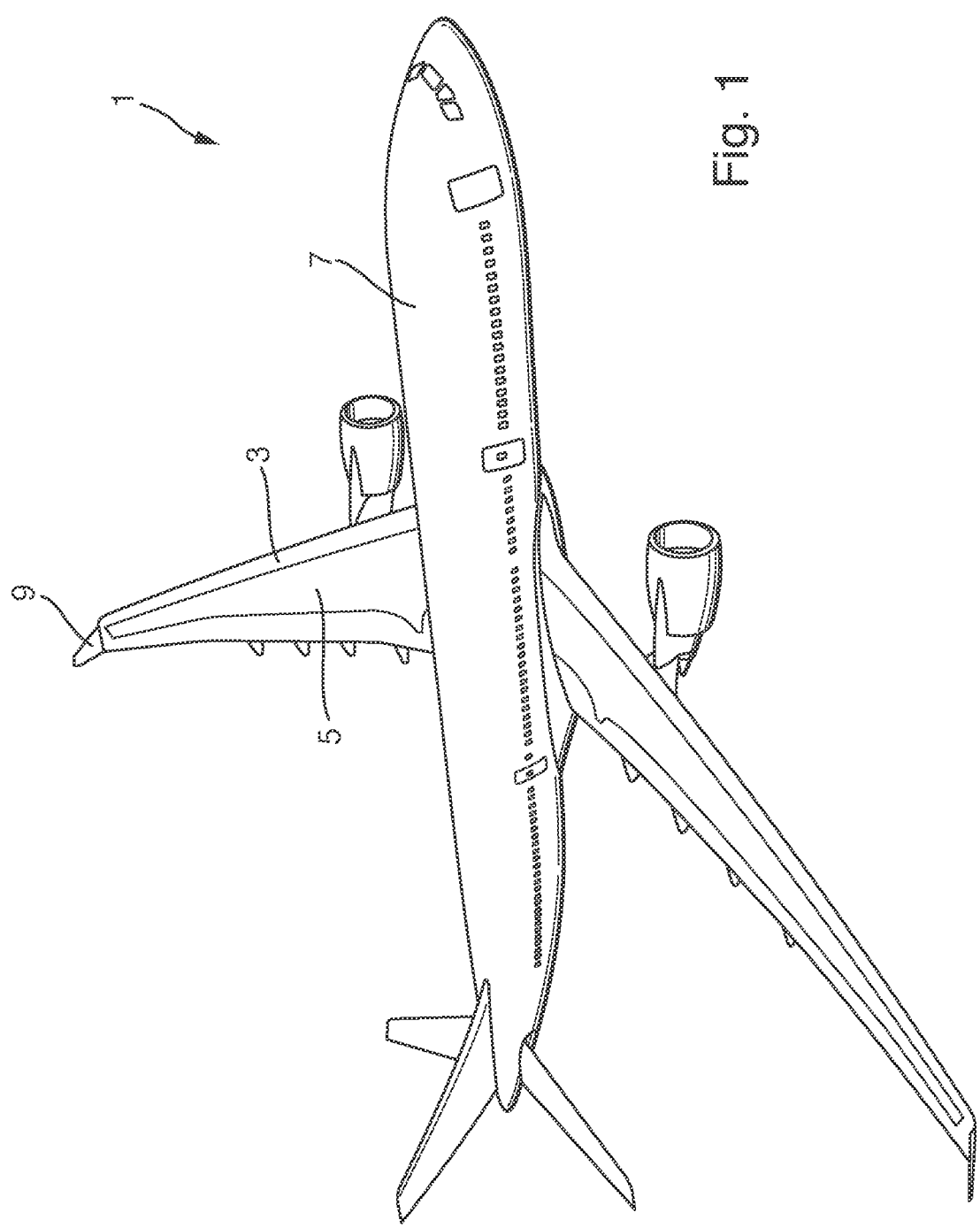
FIG. 1 is a perspective view of an aircraft according to an embodiment of the invention.
Figure 2:
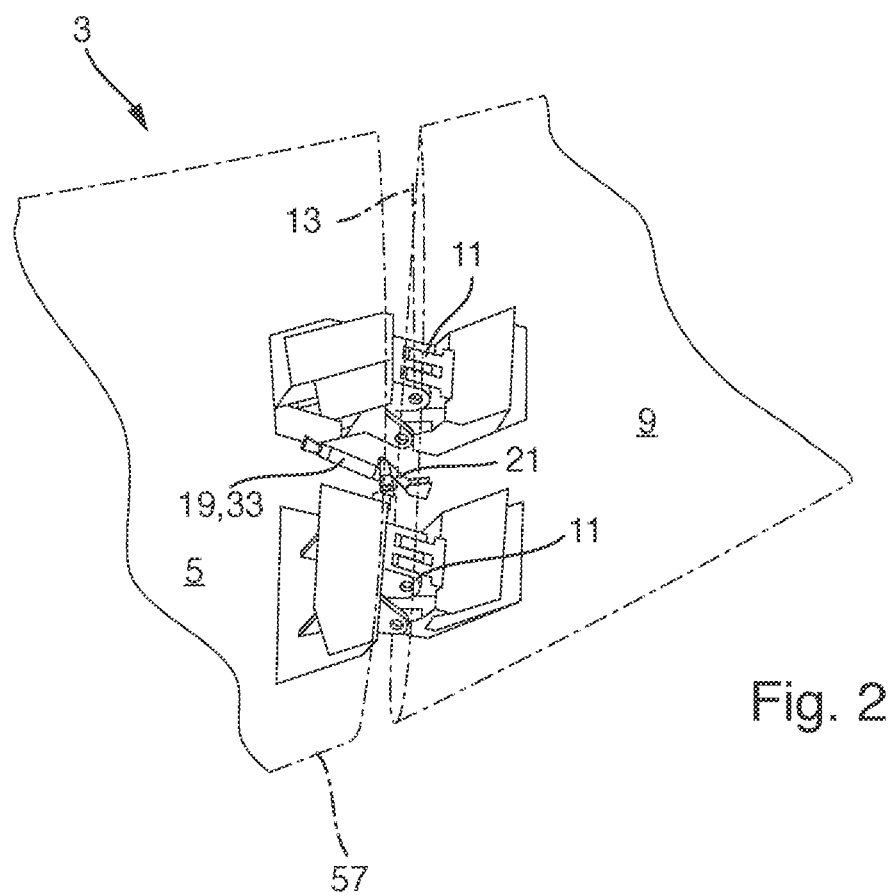
FIG. 2 is a top view of the wing shown in FIG. 1 with a focus on the actuation unit and linkage.

FIG. 1 shows an exemplary aircraft 1 according to an embodiment. The aircraft 1 comprises a foldable wing 3 including a fixed wing 5 mounted to a fuselage 7, and a foldable wing tip portion 9 movably mounted to the fixed wing 5.

FIGS. 2 to 5 illustrate the wing 3 of the aircraft 1 shown in FIG. 1 in further detail. The foldable wing tip portion 9 is mounted to the fixed wing 5 via first hinges 11 rotatable about a first hinge axis 13 between an extended position 15 (see FIG. 4) and a folded position 17 (see FIG. 5). In the extended position 15 the foldable wing tip portion 9 extends as a continuous extension of the fixed wing 5 in a common plane with the fixed wing 5, wherein in the folded position 17 the foldable wing tip portion 9 extends upwards in order to reduce the overall span of the aircraft 1. The hinge axis 13 extends in parallel to a chord line and in a flight direction of the aircraft 1.

Figure 3:
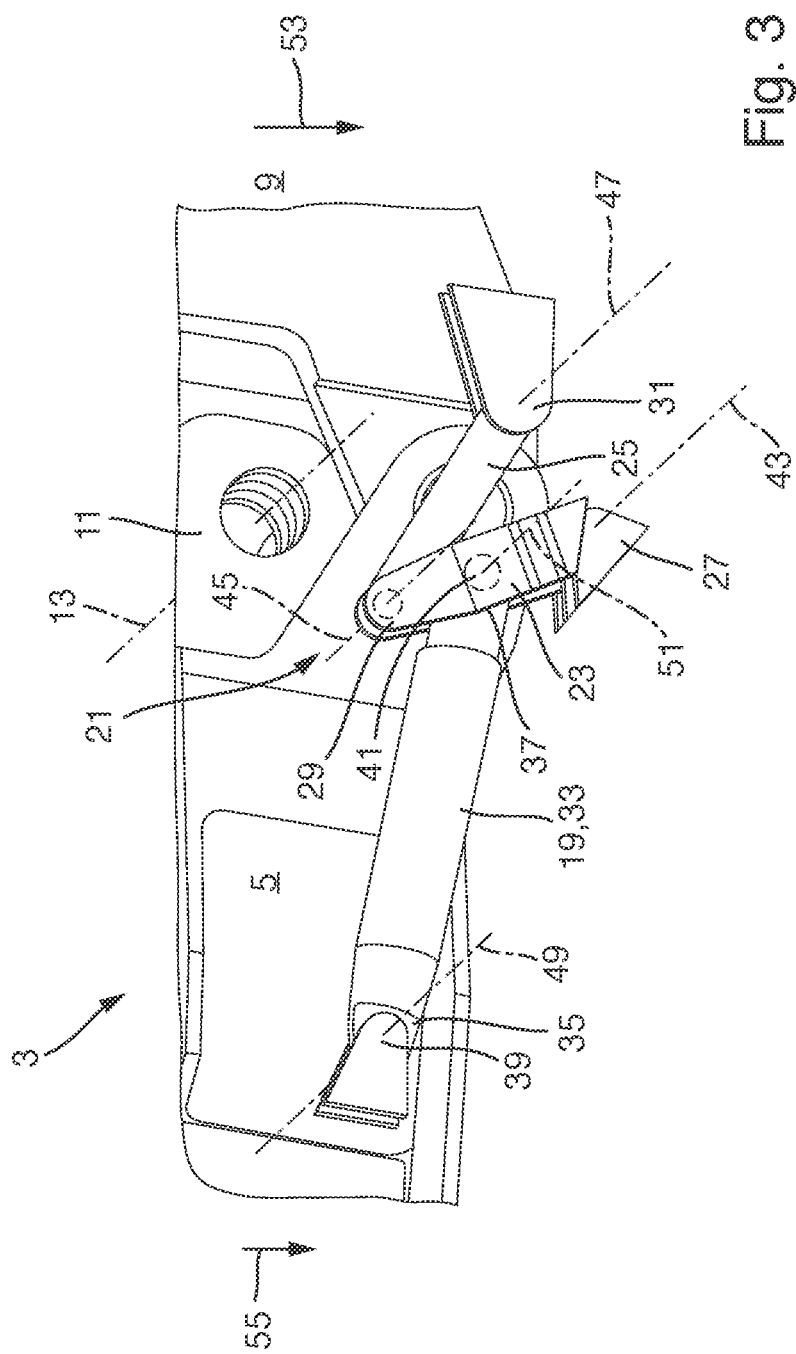
FIG. 3 is a perspective detailed view of the actuation unit and linkage as shown in FIG. 2.
Figure 4:
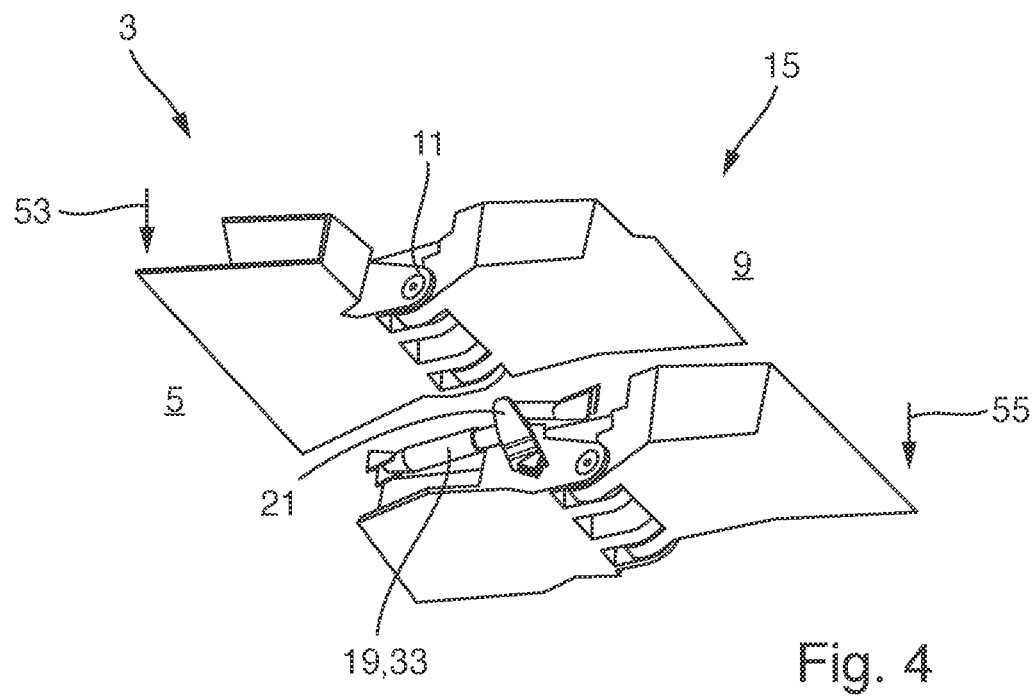
FIG. 4 is a functional illustration of the wing shown in FIG. 2, with the foldable wing tip portion in the extended position.
Figure 5:
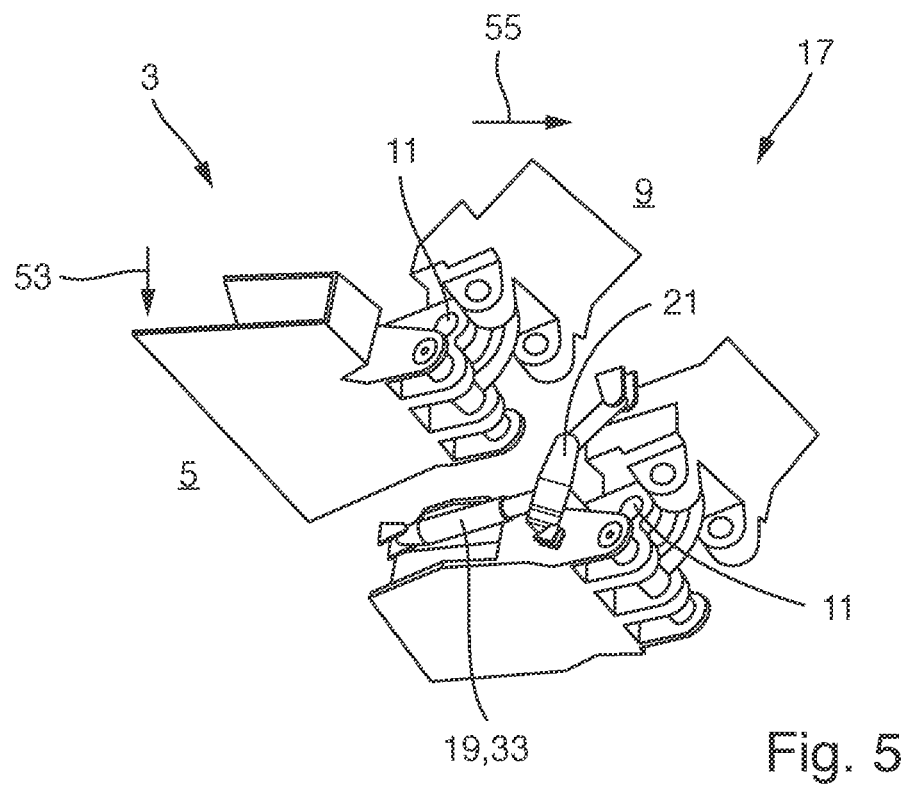
FIG. 5 is a functional illustration of the wing shown in FIG. 2, with the foldable wing tip Portion in the folded position.

Further, the wing 3 comprises an actuation unit 19 for moving the foldable wing tip portion 9 about the hinge axis 13 relative to the fixed wing 5. The actuation unit 19 is arranged at the fixed wing 5 and coupled to the foldable wing tip portion 9 via a linkage 21 including a first link element 23 and a second link element 25, as shown in FIG. 3. The first link element 23 is rotatably mounted to the fixed wing 5 via a second hinge 27, and is rotatably mounted to the second link element 25 via a third hinge 29 spaced from the second hinge 27. The second link element 25 is rotatably coupled to the foldable wing tip portion 9 via a fourth hinge 31 spaced apart from the third hinge 29. Further, the actuation unit 19 is formed as linear actuator 33 configured to adjust a distance between a first mount 35 and a second mount 37. The linear actuator 33 in the present embodiment is a rod-shaped hydraulic cylinder. The first mount 35 is rotatably mounted to the fixed wing 5 via a fifth hinge 39, and the second mount 37 is rotatably mounted to the first link element 23 via a sixth hinge 41 spaced apart from the second hinge 27.

The second hinge 27 defines a second hinge axis 43, the third hinge 29 defines a third hinge axis 45, the fourth hinge 31 defines a fourth hinge axis 47, the fifth hinge 39 defines a fifth hinge axis 49, and the sixth hinge 41 defines a sixth hinge axis 51. The second hinge axis 43, the third hinge axis 45, the fourth hinge axis 47, the fifth hinge axis 49, and the sixth hinge axis 51 extend in parallel to the first hinge axis 13.

The fourth hinge 31 is spaced apart from the first hinge 11 in a tip thickness direction 53 of the foldable wing tip portion 9. Specifically, the fourth hinge 31 is positioned lower than the first hinge 11 with respect to the tip thickness direction 53 of the foldable wing tip portion 9 in the extended position 15. Similarly, the second hinge 27 is spaced apart from the first hinge 11 in a wing thickness direction 55 of the fixed wing 5. Specifically, the second hinge 27 is positioned lower than the first hinge 11 with respect to the wing thickness direction 55 of the fixed wing 5. Further, the second hinge 27 is positioned lower than the third hinge 29 with respect to the wing thickness direction 55 of the fixed wing 5, so that the first link element 23 pivots within a range above the second hinge 27 when the foldable wing tip portion 9 is moved between the extended and folded positions 15, 17.

The linkage 21 and the actuation unit 19 are formed and arranged such that they remain entirely inside an outer contour 57 of the wing formed by an outer skin, when the foldable wing tip portion is moved between the extended and folded positions 15, 17.

The sixth hinge 41 is arranged at the first link element 23 spaced apart from the second hinge 27 by about 66% of the distance between the second hinge 27 and the third hinge 29. Further, the actuation unit 19 is arranged such that the distance between the first mount 35 and the second mount 37 is increased when the foldable wing tip portion 9 is moved to the folded position 17, so that, the actuation unit 19 pushes the first link element 23 when moved to the folded position 17.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing, comprising:
   a fixed wing,
   a foldable wing tip portion mounted to the fixed wing via a first hinge rotatable about a first hinge axis parallel to a chord line of the fixed wing between an extended position and a folded position extending upwardly, and
   an actuation unit for actuating the foldable wing tip portion for movement about the first hinge axis,
   wherein the actuation unit is arranged at one of the fixed wing and the foldable wing tip portion and is coupled to the other of the fixed wing and the foldable wing tip portion via a linkage including a first link element and a second link element,
   the first link element is rotatably mounted to the one of the fixed wing and the foldable wing tip portion via a second hinge and is rotatably coupled to the second link element via a third hinge,
   the second link element is rotatably mounted to the other of the fixed wing and the foldable wing tip portion via a fourth hinge,
   the actuation unit is formed as linear actuator configured to adjust a distance between a first mount and a second mount,
   the first mount is rotatably mounted to the one of the fixed wing and the foldable wing tip portion via a fifth hinge, and
   the second mount is rotatably mounted to the first link element via a sixth hinge spaced apart from the second hinge.

2. The wing according to claim 1, wherein the actuation unit is arranged at the fixed wing and is coupled to the foldable wing tip portion via the linkage,
   wherein the first link element is rotatably mounted to the fixed wing via the second hinge,
   wherein the second link element is rotatably mounted to the foldable wing tip portion via the fourth hinge, and
   wherein the first mount is rotatably mounted to the fixed wing via the fifth hinge.

3. The wing according to claim 1, wherein the second hinge defines a second hinge axis, wherein the third hinge defines a third hinge axis, wherein the fourth hinge defines a fourth hinge axis, wherein the fifth hinge defines a fifth hinge axis, wherein the sixth hinge defines a sixth hinge axis, and
   wherein the second hinge axis and/or the third hinge axis and/or the fourth hinge axis and/or the fifth hinge axis and/or the sixth hinge axis extend in parallel to the first hinge axis.

4. The wing according to claim 2, wherein the fourth hinge is spaced apart from the first hinge in a tip thickness direction of the foldable wing tip portion.

5. The wing according to claim 4, wherein at least in the extended position of the foldable wing tip portion the fourth hinge is positioned lower than the first hinge with respect to the tip thickness direction of the foldable wing tip portion.

6. The wing according to claim 2, wherein the second hinge is spaced apart from the first hinge in a wing thickness direction of the fixed wing.

7. The wing according to claim 6, wherein the second hinge is positioned lower than the first hinge with respect to the wing thickness direction.

8. The wing according to claim 1, wherein the second hinge is positioned lower than the third hinge with respect to the wing thickness direction of the fixed wing.

9. The wing according to claim 1, wherein the linkage and the actuation unit are formed and arranged such that the linkage and the actuation unit remain entirely inside an outer contour of the wing when the foldable wing tip portion is moved between the extended and folded positions.

10. The wing according to claim 1, wherein the sixth hinge is arranged at the first link element spaced apart from the second hinge by between 10% to 100% of the distance between the second hinge and the third hinge.

11. The wing according to claim 1, wherein the actuation unit is arranged such that the distance between the first mount and the second mount is increased when the foldable wing tip portion is moved to the folded position.

12. An aircraft comprising the wing according to claim 1.

13. The wing according to claim 3, wherein the fourth hinge is spaced apart from the first hinge in a tip thickness direction of the foldable wing tip portion.

14. The wing according to claim 3, wherein the second hinge is spaced apart from the first hinge in a wing thickness direction of the fixed wing.

15. The wing according to claim 4, wherein the second hinge is spaced apart from the first hinge in a wing thickness direction of the fixed wing.

16. The wing according to claim 5, wherein the second hinge is spaced apart from the first hinge in a wing thickness direction of the fixed wing.

17. The wing according to claim 1, wherein the sixth hinge is arranged at the first link element spaced apart from the second hinge by between 30% to 90% of the distance between the second hinge and the third hinge.

18. The wing according to claim 1, wherein the sixth hinge is arranged at the first link element spaced apart from the second hinge by between 50% and 80% of the distance between the second hinge and the third hinge.

* * * * *